A. H. KENNEWEG.

PORT LIGHT.

APPLICATION FILED APR. 18, 1921.

Reissued Aug. 23, 1921. 15,181.

Inventor

ALBERT H. KENNEWEG

Ch. Parker Attorney

UNITED STATES PATENT OFFICE.

ALBERT H. KENNEWEG, OF BROOKLYN, NEW YORK.

PORT-LIGHT.

15,181. Specification of Reissued Letters Patent. Reissued Aug. 23, 1921.

Original No. 1,350,507, dated August 24. 1920, Serial No. 374,345, filed April 16, 1920. Application for reissue filed April 18, 1921. Serial No. 462,430.

*To all whom it may concern:*

Be it known that I, ALBERT H. KENNEWEG, a citizen of the United States, residing at Brooklyn, in the county of Kings and State of New York, have invented certain new and useful Improvements in Port-Lights, of which the following is a specification.

This invention relates to improvements in port lights.

An important object of the invention is to provide a device of the above type, having means for securing and fastening the port light in closed position.

A further object of the invention is to provide means in combination with a port light, whereby the port light may, in one continuous operation, be released and opened or swung to the closed position and fastened as the case may be.

These and other objects I obtain by the combination and arrangement of parts shown in the accompanying drawings, wherein for the purpose of illustration is shown a preferred embodiment of my invention, and wherein like numerals are employed to designate like parts throughout,—

Figure 1:
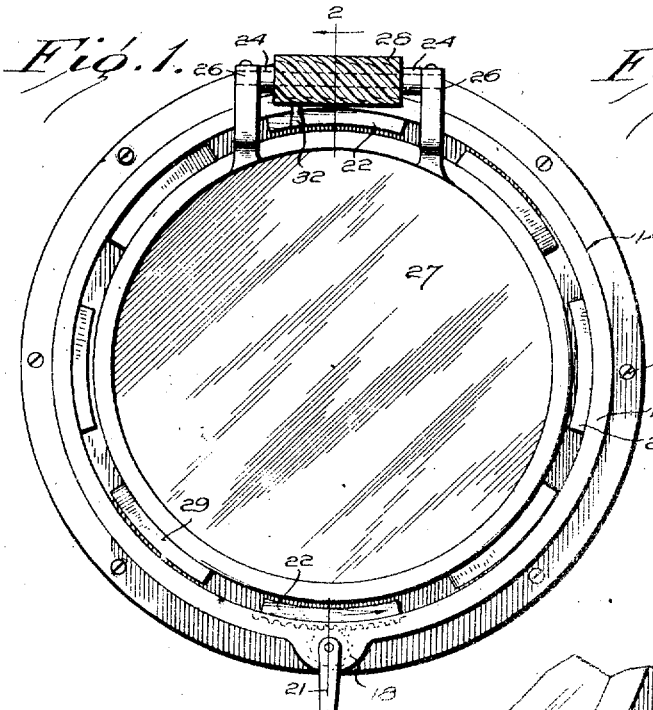
Figure 1 is a front elevation of a port light embodying my invention.
Figure 2:
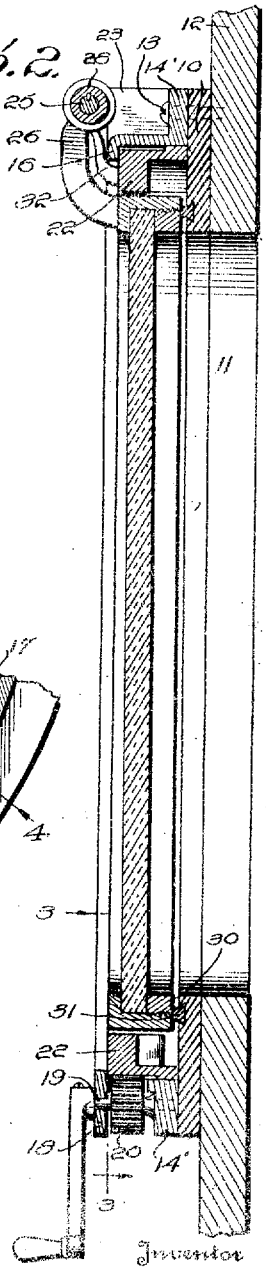
Fig. 2 is an enlarged section taken on line 2—2 of Fig. 1.

Referring now more particularly to the drawings, the numeral 10 indicates an annular casing ring, secured about an opening 11, formed in the hull 12 of the ship, by means of screws 13, or the like. A second annular ring 14 has its flange 14′ arranged upon the ring 10, and secured thereto by the screws 13, in any other suitable manner. A rotatable ring 15 is mounted within the ring 14, and held in position by means of an inwardly extending flange 16, formed upon the ring 14, which engages the outer surface of the rotatable ring 15.

The rotatable ring 15 is provided upon the surface thereof, lying adjacent to the ring 14, with gear teeth 17. The ring 14 is provided with an outwardly extending portion 18, extending over the flange 14′ thereof. The shaft 19 is rotatably journaled in the outwardly extending portion 18 and in the flange 14′, and has secured thereto a pinion 20, the periphery of which extends through an opening 20′, formed in the ring 14, and has its teeth in engagement with the gear teeth 17 of the ring 15. Externally of the outwardly extending portion 18, the shaft 19 is provided with an operating handle 21.

It will be seen that by rotating the operating handle 21, the ring 15 is rotated. The ring 15 is provided with internally extending wedged projections, spaced about its interior, four of the projections being shown in the present illustration, although the number actually used is not so limited.

The ring 14 is provided with a pair of spaced supports 23, terminating at their outer ends in journal 24, rotatably receiving a shaft 25. The ends of the shaft 25 extend beyond journals 24, and have secured thereto, the hinges 26 of a port light 27. Intermediate the journals 24, the shaft 25 has secured thereto a cam or worm 28.

Figure 3:
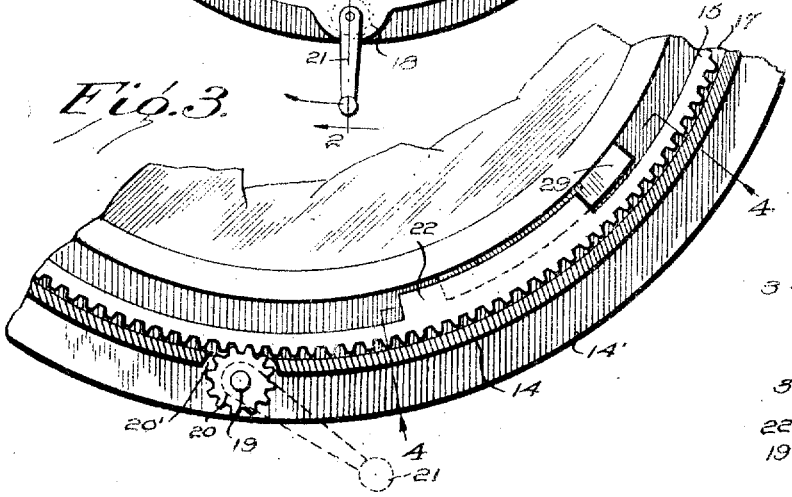
Fig. 3 is an enlarged section taken on line 3—3 of Fig. 2.
Figure 4:
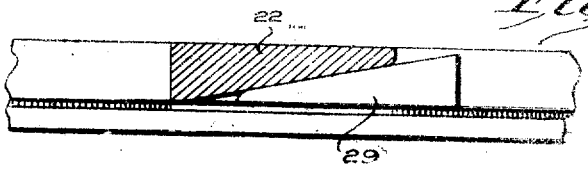
Fig. 4 is a section taken on line 4—4 of Fig. 3.

The port light 27 is provided upon the exterior of the frame thereof with outwardly extending portions 29, wedge shape in form, and corresponding in number and relation to the projections 22 of the ring 15. The projections 29 are tapered in the opposite directions from the projections 22, the tapered faces being adapted to co-act to force the inner face 30 of the glass holding rim of the port light 27 into engagement with a compressible gasket mounted in the annular plate 10. In Fig. 1, these wedges are shown in separate relation. If the handle is now rotated in the direction of the arrow on Fig. 1, the ring 15 and wedges 22 are moved to engage the wedges 29 of the port light, as shown in Figs. 3 and 4.

To one of the wedges 22 is secured a finger 32. This finger is so arranged that, as the wedges are moved from engagement, the finger engages the worm 28, causing the same to rotate. This rotation through medium of the shaft 25, is transmitted to the port light 27, and the port light opened. Rotated in the opposite direction or the direction of the arrow shown in Fig. 1, the finger causes the worm to rotate in such a direction as to close the port light 27, the port light being placed in a closed position prior to the time when adjacent edges of the wedges overlap. As the rotation is continued, the wedges engage, forcing the face 30 to engage the compressible gasket 31, as previously described.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. The combination with a member having an annular opening and a hinged cover closing said opening, of a locking member rotatably mounted in said opening, and means actuated thereby to turn said cover on its hinge.

2. The combination with a member having an annular opening and a hinged cover closing said opening, of a locking member rotatably mounted in said opening, said locking member being provided with spaced wedges, said cover being provided with cooperating members to be engaged by said wedges, and means actuated by the rotation of said locking member to turn said cover on its hinge.

3. The combination with a member having an annular opening and a hinged cover closing said opening, of a rotatable locking member mounted in said opening, a finger carried by said locking member, and means carried by said cover to be engaged by said finger to raise and lower said cover.

4. In a hinged cover, a pair of spaced supports, a shaft rotatably mounted therein, a worm secured thereto, a cover member embodying a hinge, said hinge being secured to said shaft, a locking member rotatably mounted about said cover, means operated by the rotation of said locking member to retain said cover in closed position, and means carried by said locking member and engaging said hinge subsequently to the release of the cover to raise it.

5. The combination with a port light, of a member rotatably mounted thereabout, and means actuated by the rotation of said member for opening and closing said port light.

6. The combination with a port light, of a member rotatably mounted thereabout, and means actuated by the rotation of said member for opening and closing said port light and wedging, and releasing the same.

7. The combination with a port light adapted to be shifted to open and closed positions, of a member carried by said port light and adapted to shift said port light, a rotatable member mounted about said port light, and a finger carried by said rotatable member adapted to engage the member carried by the port light and shift the same when the rotatable member is rotated.

8. In a device of the type described, a pair of spaced supports, a shaft rotatably mounted therein, a worm secured to said shaft, a port light carrying hinge lugs, said hinge lugs being secured to said shaft, a member rotatably mounted about said port light, means operated by the rotation of said member for releasing and securing said port light, and means carried by said rotatable member and engaging said worm to open and close said port light.

In testimony whereof, I affix my signature, in the presence of two witnesses.

ALBERT H. KENNEWEG.

Witnesses:
GAYLE A. HENDRICKSON,
VICTOR A. ANDERSON.